Fig. 2

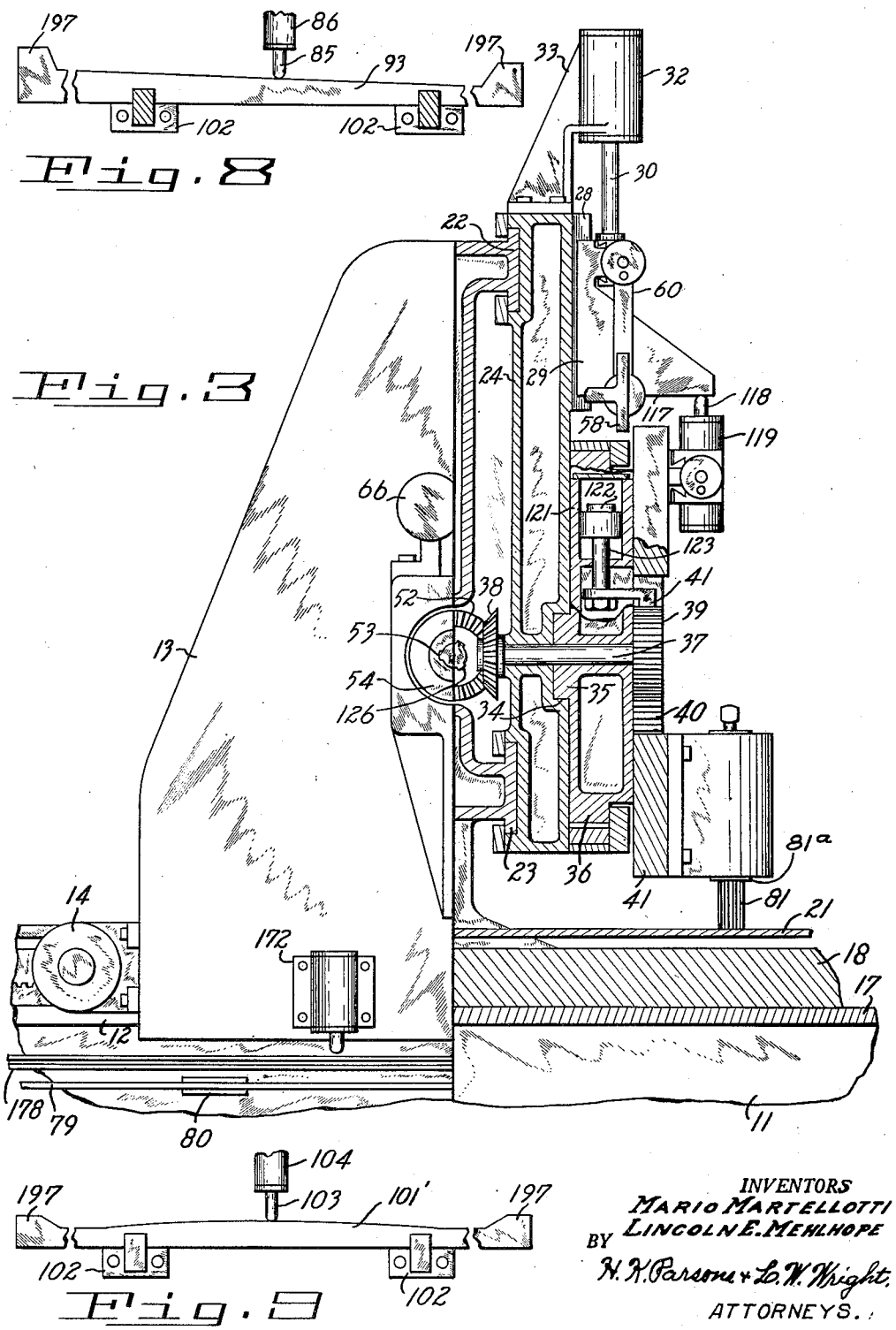

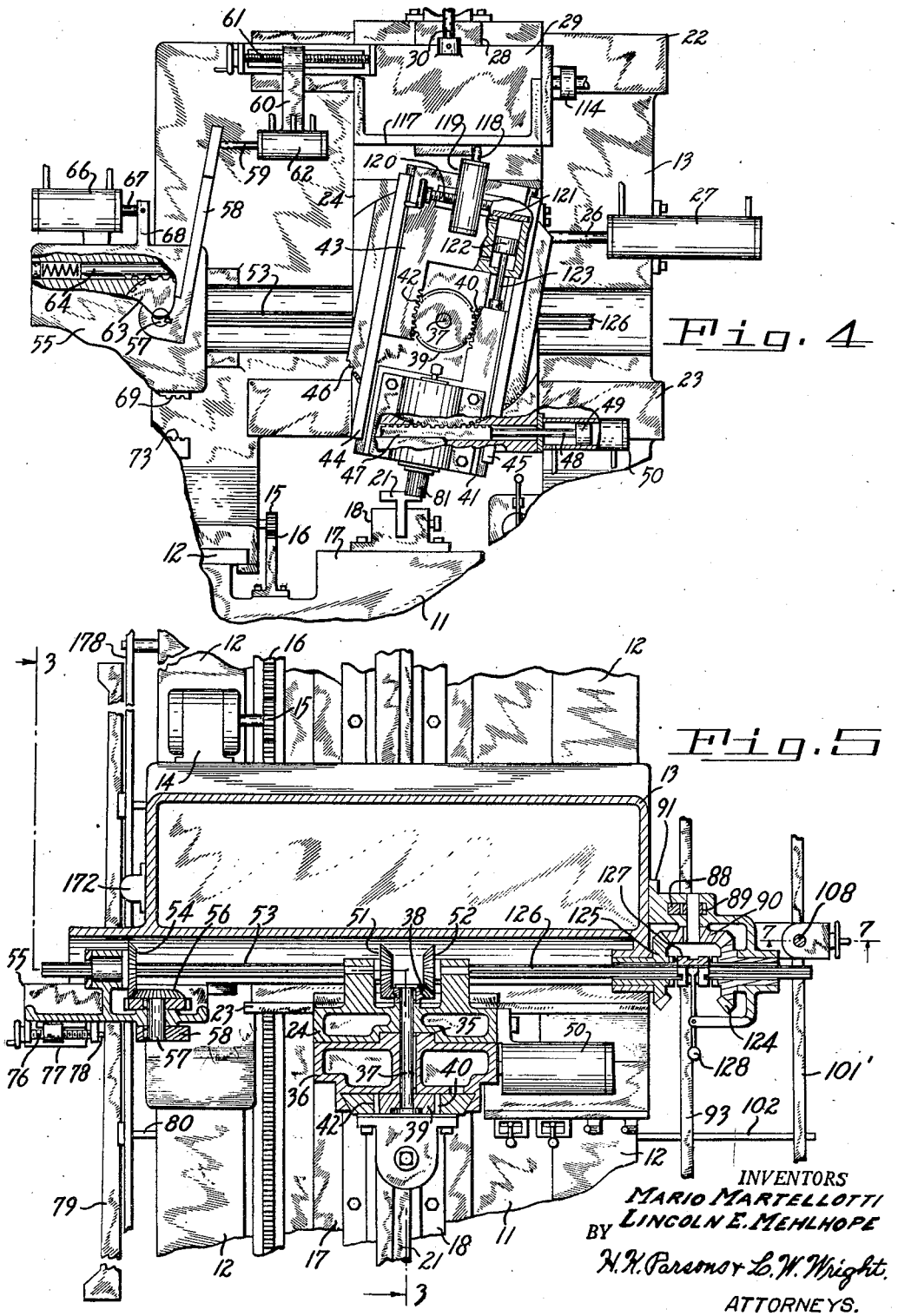

Patented Apr. 20, 1954

2,675,743

UNITED STATES PATENT OFFICE 2,675,743

CONTOUR MILLING MACHINE

Mario Martellotti and Lincoln E. Mehlhope, Cincinnati, Ohio, assignors to The Cincinnati Milling Machine Co., Cincinnati, Ohio, a corporation of Ohio Application September 6, 1951, Serial No. 245,378

17 Claims. (Cl. 90—13.5)

This invention relates to improvements in milling machines and has particular reference to an improved structure for the production of varying or irregular surfaces or contours.

One of the principal objects of the present invention is the provision of an improved automatic machine particularly adapted for the production of long work pieces, such as airplane spars or the like having variable height and twisted or warped effect final surface contours.

A further object of the invention is the provision of an improved type of milling machine facilitating the continuous control of both depth and angle of cut being produced.

An additional object of the invention is the provision of a machine of this character in which the cross movement may be correspondingly simultaneously varied so that the cutter will accurately describe a sinuous or other path along the surface being formed on the work piece and in which the several movements may be automatically controlled in a simple and effective manner.

The invention further contemplates an improved type of milling machine in which the angular relationship between the cutter and work may be varied and in which means are provided effective to compensate for potential displacement of the cutter with respect to the traverse path resulting from such angular adjustment.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

Figure 2 is a front view of the machine.

Figure 3 is a vertical sectional view on the line 3—3 of Figure 5.

Figure 4 is an enlarged view of the spindle carrier and associate parts.

Figure 5 is a horizontal section on the line 5—5 of Figure 2.

Figure 7 is an enlarged sectional view through one of the hand slide adjusting mechanisms on the line 7—7 of Figure 5.

Figure 8 is a detail view on one of the control patterns.

Figure 9 is a similar view of another of the pattern elements.

Figure 10 is a section on the line 10—10 of Figure 2.

Figure 1:
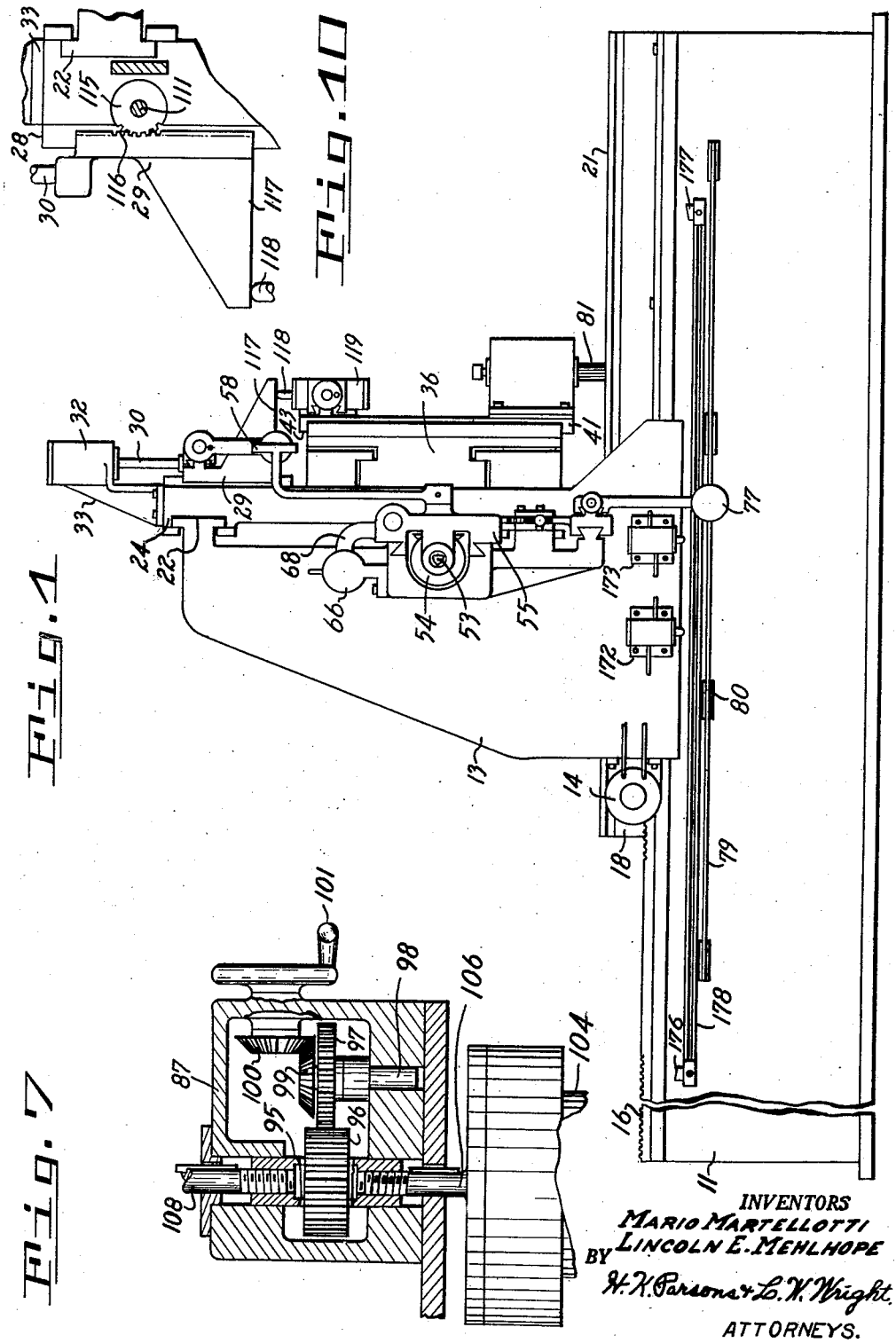
Figure 1 is a side elevation of a machine embodying the present invention.

In the drawings the numeral 11 designates the bed of the type of machine chosen for purposes of illustration of the principles of the invention, said bed having the ways 12 on which is translatably mounted the column 13. Column 13 carries a motor 14 which through suitable gearing drives pinion 15 meshing with rack 16 on the bed for effecting longitudinal movement of the column. Intermediately the bed is provided with a table portion 17 supporting the work holding clamps or fixtures 18 for the work piece which is shown as substantially a T-rail in cross section, having the vertically held flange 19 secured in the fixture by clamps 20 and the cross flange or head 21 on which in the present instance the milling operation is being performed. The column 13 is provided with ways 22 and 23 on the transversely adjustable carriage or cross head unit 24. Traverse of this unit is effected by piston 25 coupled with the carriage or slide by piston rod 26, this piston moving in cylinder 27 carried by the column. The upper portion of the cross slide or carriage 24 is provided with vertical guides or ways 28 for the vertical slide 29. A rod 30 couples this slide with piston 31 movable in cylinder 32 supported on the main cross slide by bracket 33.

At its lower portion the cross slide 24 has the countersunk cylindrical bearing recess 34 to receive the trunnion 35 of the angularly adjustable spindle carrier unit 36 which is thus supported for tilting movement as shown, for example, in Figure 4.

Keyed in the member 36 concentric with the trunnion 35 is a shaft 37 provided at one end with the bevel gear 38 and rotatably supporting on its opposite end the pinion 39. This pinion meshes at its right hand side with the rack 40 of the spindle carrier slide 41 which carries the cutter spindle 81a and at its left with the rack 42 of the tracer slide 43, rotation of the pinion 39 thus timing the spindle carrier slide 41 and the tracer slide 43 for equal but opposite incremental movements.

These slides are supported on the face of the angularly adjustable spindle carrier unit by the ways or guides 44 and 45, the member 41 moving in the lower portion of these guides and the member 43 in the upper portion thereof. The angularly adjustable spindle carrier is provided at 46 with a segmental circular rack meshing with the sliding rack bar 47 actuable by piston rod 48 and piston 49 which move in cylinder 50 secured to the cross slide 24.

Reciprocation of piston 49 serves to vary the angular position of the spindle carrier. Due to the spline connection between the spindle carrier and shaft 37 this, in turn, imparts rotary movement to bevel gear 38 which meshes with the gears 51 and 52. Gear 51 is carried by spline shaft 53 on which is slidable gear 54 carried by a compensator slide 55 having a meshing gear 56 on a spindle or stub shaft 57 supporting on the face of the slide the angularly adjustable template 58. The ratio of gearing is such that as the spindle carrier is tilted, a corresponding tilt will be imparted to the template member 58 to react on the tracer 59 carried by the slide bracket 60 on the vertical movement control slide 29. Screw 61 determines the adjusted position of the tracer body 62 with respect to slide 29. To take up any possible backlash as respects member 58 the spindle 57 has been provided with a spur gear 63 against which operates the spring pressed backlash take-up plunger 64.

The transverse position of the compensator slide 55 is controlled by piston 65 movable in cylinder 66 carried by the column 13 and connected by rod 67 with bracket 68 on the slide 55. Slide 55 is provided with a rack 69 connected by the series of intermeshing pinions 70, 71, 72 with rack 73 on the tracer slide 74, or alternatively, by the pinions 75 and 72. With the parts in the position shown in Figure 2, any movement of slide 55 to the right will react through these pinions to back off or compensatingly move slide 74 to the left. Adjustably mounted on the slide 74 and shiftable by rotation of the adjusting screw 76 is the tracer head 77 carrying a tracer 78 engaging the transverse movement control template 79 carried by brackets 80 on the bed 11. As a result of the intergearing connection described, any movement of the compensatory slide 55 toward the right will affect corresponding movement of the tracer head 77 to the left, with valve 83 in the position shown in Figure 6. If the tracer 78 is riding up an incline on the cam 79, the tracer deflection will cause a hydraulic reaction in cylinder 66, moving slide 55 and thus carriage 24 to the right. The tracer head 77, however, moved by the gears to the left, will shut off the flow through the tracer valve. Thus, the transverse position of the slide 55 is accurately determined by the pattern or template 79 during longitudinal traverse of the column 13. Shifting of the slide 55 carries with it the template 58 which through reaction on the tracer 59 varies the pressure conditions within the cylinder 27 and thus the position of the cross slide 24.

Figure 2:
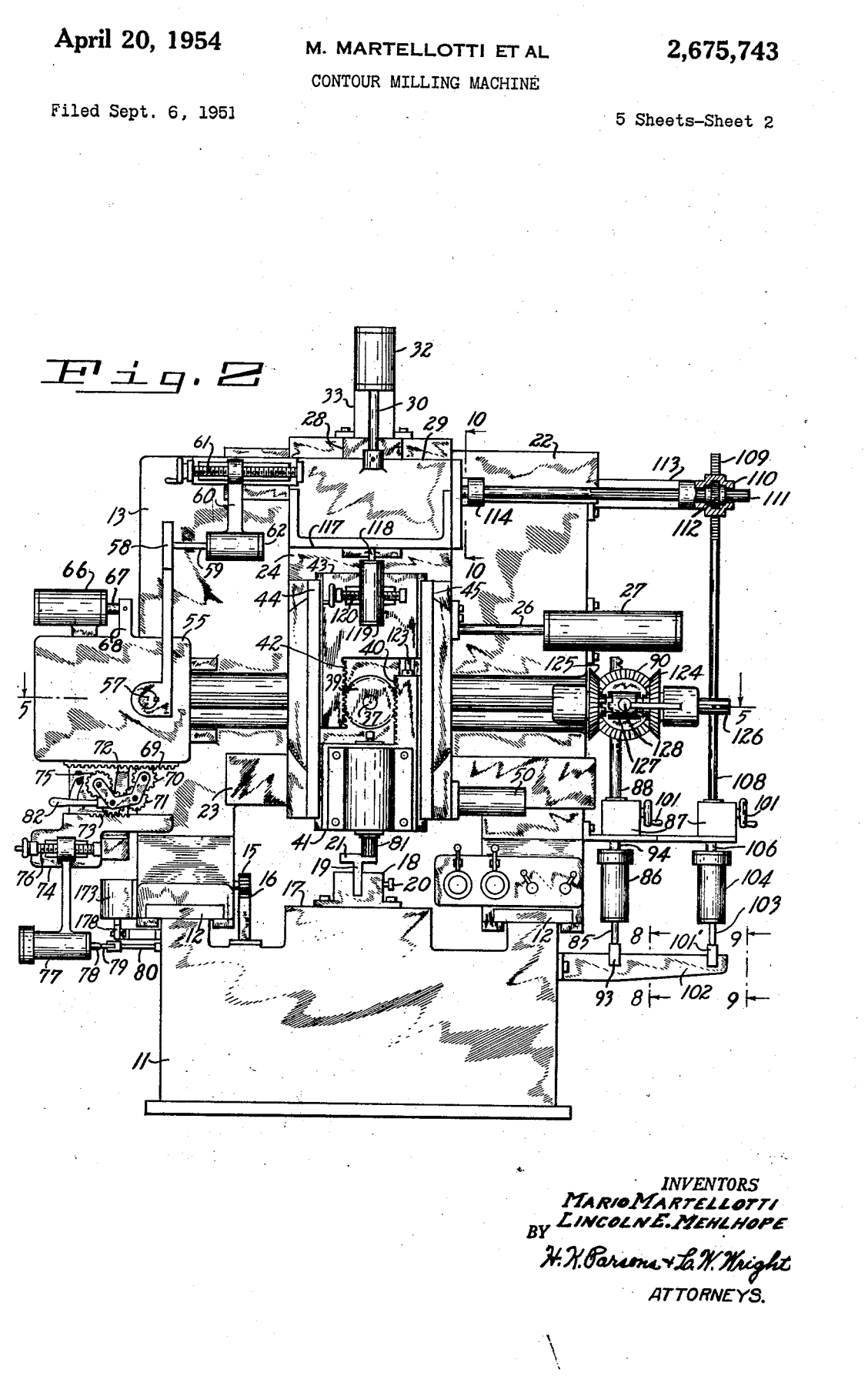

The relationship of the parts just described is particularly intended to take care of the cutting conditions illustrated in Figures 2 and 4, for example, when the cutter 81 carried by spindle 81a is operating on the right hand portion of the work piece. When it is desired that the cutter be operating primarily from vertical to left hand angled position on the left side of the work piece to produce a corresponding but opposite hand configuration by the use of the same template member 79, handle 82 is operated to disengage pinion 70 from rack 69 and engage therewith the pinion 75. At the same time valve 83 is shifted by handle 84 to interchange the connection in the conduit lines intervening the tracer head 77 and the cylinder 66. With the parts in this position, the tracer 78, as before, following the template 79, out movement of the tracer point to the left will cause a movement of the slide 55 to the left. In other words, for a corresponding movement of the tracer point, the cutter will now be moved from the center of the work outwardly toward the left hand edge of the work. Due to the reversal, the effect produced by the pinions 70 and 75, the compensating shutting off movement of the tracer head 77 will be effected, as before, toward the left or in the same direction that slide 55 moves.

With the parts in the position shown in Figures 2 and 4, tilting movement of the spindle carrier 36 is determined by template 93 cooperating with tracer head 86 depending from housing 87 supported by rack bar 88 which is in mesh with the pinion 89 on gear 90 mounted in bracket 91 carried by the column 13. Tracer 86 is connected through reversing valve 92 with cylinder 50 for determination of the angular positioning of the spindle carrier. Pressure introduced in the right hand end of the cylinder with the parts as shown will cause movement of the axis of cutter 81 in a clockwise direction, while pressure in the left hand end of the cylinder will cause movement of the cutter in a counterclockwise direction. If, however, the position of the valve 92 is changed 90 degrees, tracer deflections will oppositely vary the pressure conditions so that a corresponding deflection of the tracer will cause a counterclockwise in place of clockwise tilting and vice versa. Valves 83 and 92 may therefore be independently actuated, or, as indicated in the diagram, may be simultaneously reversed by the handle 84, at once changing the relative control movements effected by the tracer points 78 and 85.

For effecting vertical positioning adjustment of the tracer head 86 with respect to its control template 93, the support shaft 94 for the tracer head and member 88 correspond in structure with the parts 106 and 108 shown in Figure 7. Like these parts, they are splined for sliding movement with respect to casing 87 which rotatably mounts the right and left hand threaded turn buckle or sleeve 95. Formed on the sleeve is an exterior gear 96 engaged by the pinion portion 97 of the compound gear 97—99 supported on the stud shaft 98 and having its beveled portion 99 meshing with bevel gear 100 actuable by handle 101 for rotating the turn buckle or sleeve nut 95 to increase or decrease the effective length of the supporting elements 88—94 or 106—108 as shown in Figure 7.

The gear 90 is in mesh jointly with the gears 124 and 125 freely rotatable on the spline shaft 126. The intermediate clutch 127 settable by clutch shifting lever 128 serves selectively to couple one or the other of the gears with the spline shaft for effecting a feed back drive through gear 90 to the tracer head 86. The spline shaft has mounted on its inner end the gear 52 in mesh with the bevel gear 38. Consequently, any tilting movement of the spindle carrier occasioned by pressure condition variations in cylinder 50 due to deflection of the tracer finger 85 feeds back through 38, 52, 124, or 125 and 90—88 to readjust the position of the tracer head 86. The purpose of the selector clutch 127 is to permit automatic control of tilting from a central position in either a clockwise or counterclockwise direction. If the tilting is in a clockwise direction, this should be due to a release or downward movement of the finger 85. Consequently, the compensation to stop such clockwise movement must be a downward movement of the tracer head 86 which will be effected properly only if gear 124 is coupled with the spline shaft. On the other hand, if control of corresponding movement is to be made by the same template as respects counterclockwise tilting of the spindle carrier, then gear 125 must be coupled. As has previously been pointed out, the valve 92 is shifted in correspondence with the shifting movement of the clutch 127 to effect these results.

The actual vertical movement of the cutter spindle is controlled by the template 101' mounted on the bed by brackets 102 and cooperating with the tracer finger 103 carried by the tracer head 104. This tracer head is suspended by a shaft 106 connected as shown in Figure 7 to the feed back rod 108, by the same mechanism previously described that connects members 88 and 94. This rod has the rack portion 109 sliding in the bracket 110 mounted on spline shaft 111, the rack 109 meshing with pinion 112 which is slidably mounted on the spline shaft 111.

These parts are supported by the bracket 113 carried by the column 13. Spline shaft 111 has its inner end journaled in the bearing 114 and is provided with a pinion 115 meshing with rack 116 on the vertically movable slide 29. Deflections on tracer 103 react on the valve mechanism in tracer head 104 to control the introduction and exhaust of pressure within the cylinder 32 for movement of the piston 31 and thus slide 29 while the rack and pinion and spline shaft mechanism provide a feed back from the slide for repositioning of the tracer head.

The end face of the slide 29 provides a template portion at 117 cooperating with the tracer finger 118 of the tracer head 119 transversely adjustable as respects the slide 43 by means of the adjusting screw 120. By this adjustment, the finger 118 may be axially aligned with the peripheral corner or other portion of the cutter desired to be maintained in a constant position relative to the work irrespective of tilting adjustments. This tracer mechanism controls the introduction and exhaust of pressure as respects the cylinder 121 containing piston 122 coupled by piston rod 123 to the tool carrier slide 41. Deflections of the tracer due either to tilting of the spindle carrier or to vertical movements of the member 117 will react to position the cutter 81 by axial movement of the tool carrying slide, while at the same time the reaction of the tool carrier slide rack on rack 42 of the tracer head slide 43 by way of the freely rotating pinion 39 will restore the position of the tracer head with respect to the tracer controlled valve 119' to stop the tool movement.

It will be evident by comparison of Figures 2 and 4, for example, that as the spindle carrier is tilted to shift the operative face of the cutter from a horizontal plane to a position at an angle to the work that the simultaneous tilting of the template member 58 will react on tracer 59 which controls cylinder 27, shifting the main slide to the right such a distance that the inner effective edge of the cutter remains in an unchanged position with respect to the work. At the same time the swinging effect of the slide moves the tracer head 119 in an arcuate path away from the template 117 which permits an outward or upward movement of the tracer finger 118, energizing piston 122 to move the cutter downward, maintaining the inner cutting edge in the same horizontal plane as before. The combined action of these parts therefore compensates for tilting of the cutter, even though such tilting effect takes place about an axis remote from the cutter edge itself, so that a smooth continuous cutting operation may be performed with the cutter edge following a given linear path as respects the work. At the same time if it is desired that independent transverse adjustment be given to the cutter, varying the transverse extent of the path, this is automatically effected by reaction of template 79 on the tracer 78 which by reaction on the piston 65 in cylinder 66 imparts a bodily transverse movement to the slide 55 and pivoted template 58 with the result that the deflections of the tracer finger 59 serve not only to produce the compensatory movement of the parts necessitated by the angular adjustment of the cutter carrier, but take care of any desired transverse variations in the path of relative movement of work and cutter.

Figure 6:
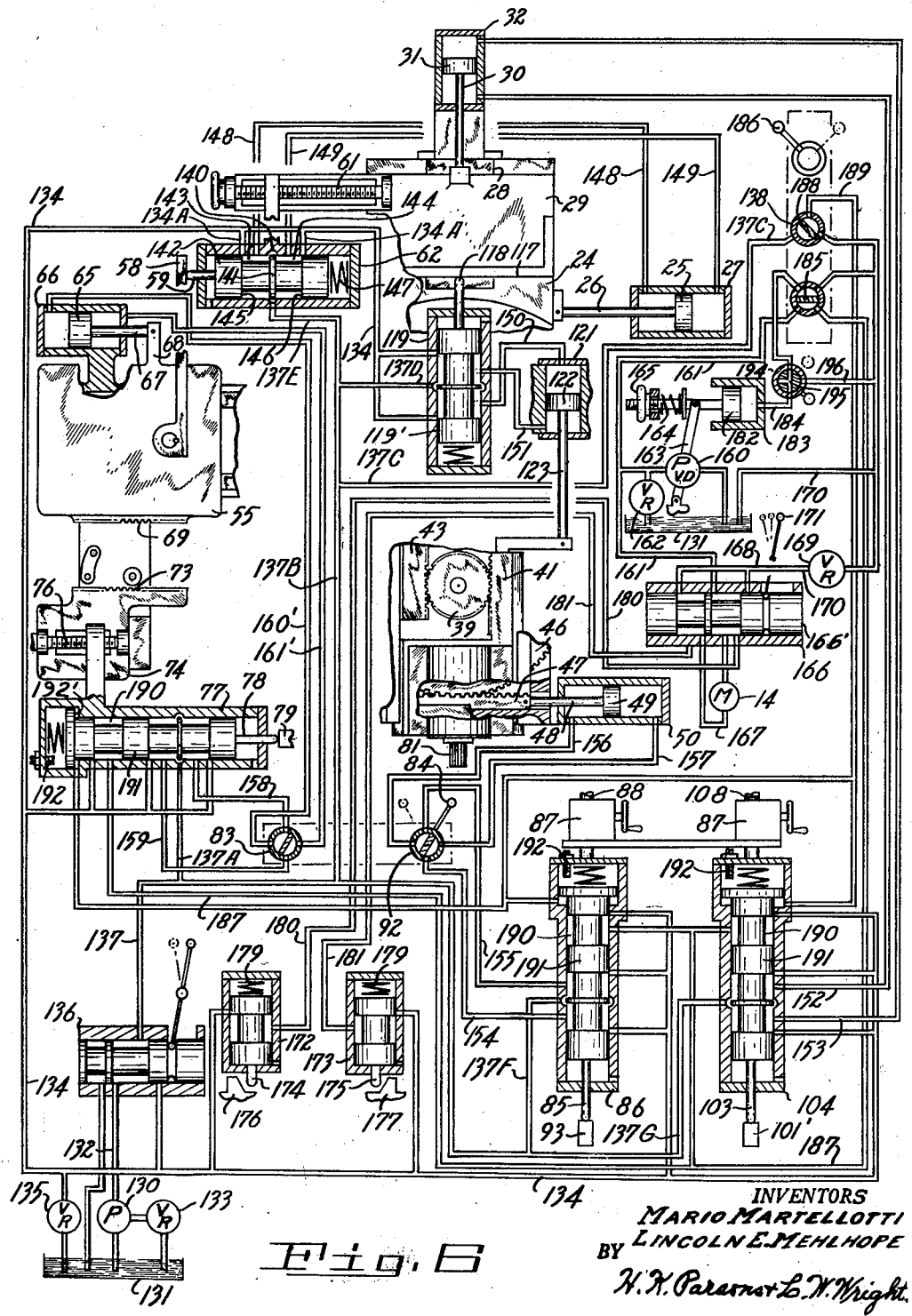
Figure 6 is a diagrammatic view illustrating the various controls for determining operation of the machine.

The details of the automatic control of the several mechanisms just described should be readily apparent by reference to the hydraulic diagram, Figure 6. As there shown, the actuating pump 130, derives hydraulic operating medium from a reservoir 131 and discharges it through conduit 132 at a pressure determined by the relief valve 133. A general reservoir or return conduit 134 is provided, discharging into reservoir, preferably through a low pressure relief valve 135, serving to maintain the system filled at all times. The pressure conduit 132 extends through the stop valve 136 to energize the multiple tracer controlled hydraulic pressure conduit system 137, having a pressure branch 137A extending to the tracer valve head 77, a branch 137B dividing into the portion 137C extending to valve casing 138, branch 137D extending to the tracer valve head 119 and the branch 137E extending to the tracer valve head 62. The pressure line has the additional branches 137F extending to the tracer valve head 86 and 137G extending to the tracer valve head 104.

The several tracer valve structures of the present machine are basically of known conventional design having the general pressure circuit 137 centrally connected at a groove 140 preferably of width to have a hydraulic underlap as respects the central rib 141 of the valve element 142 so that when the valve is in neutral there will be a pressure flow at each side of the rib. The valve element is further provided with the cannelures or grooves 143 and 144, providing passages to the respective hydraulic cylinder lines and with the shoulders 145 and 146 which in central or neutral position substantially underlap the connections 134A to the reservoir conduit system 134. Each of the valves is provided with a stylus or tracer point for engagement with a controlling template or pattern to control the position of the valve which is outwardly urged as respects the tracer valve head or casing by a spring 147. These valves function in the well-known manner that any inward displacement of the valve creates an unbalanced pressure condition, increasing the pressure in the groove at the stylus end of the valve and decreasing the pressure in the opposite groove for effecting piston movement. As shown, the tracer valve 62 for controlling the transverse movement of the main slide or carriage is coupled by conduits 148 and 149 with the opposite ends of cylinder 27. The tracer head 119 is coupled by conduits 150 and 151 with the opposite ends of cylinder 121 controlling vertical movement of the tool head or slide, and the tracer head or housing 104 is connected by conduits 152 and 153 with the opposite ends of the cylinder 32 for determination of the positioning of member 117 which reacts on the tracer finger or point 118. The tracer head 86 is coupled by conduits 154 and 155 with the valve 92 which reversibly and interchangeably couples the respective conduits with the conduits 156 and 157 extending to the cylinder 50 controlling the angular setting of the tilting slide or carrier. Similarly, the conduits 158 and 159 connect the tracer valve unit 77 with the reversing valve 83 which, in turn, interchangeably and oppositely connects the lines 158 and 159 with the lines or conduits 160' and 161' coupled to opposite ends of the cylinder 66. The present invention contemplates the utilization of hydraulic medium for driving the feed or traversing motor 14. This is preferably effected by use of a variable delivery pump 160 deriving actuating medium from the reservoir 131 and supplying it to the pressure conduit 161 at a pressure determined by the release valve 162. This variable delivery pump has the adjustable pintle 163 urged into delivery increasing position by spring 164 to the extent limited by the pintle adjusting mechanism 165. The pressure conduit 161 has a branch coupled with the reversing valve casing or bushing 166 containing valve 166' having intermediate neutral and right hand positions, in addition to the position shown in Figure 6. As shown in Figure 6, pressure is connected by the valve 166' to the upper side of the motor 14, the motor being exhausted through conduit 167 and back by way of the valve 166' and conduit 168 through the variable throttle or rate valve 169 to reservoir conduit 170. It will be understood that if the control or reversing lever 171 is shifted to the dotted line positions, shown in Figure 6, the valve will be correspondingly shifted to neutral or reverse position, and the discontinuance or reversal of operation of the motor and thus of the movement of the column on the bed will be determined.

For automatic limitation of the extent or stroke of movement of the column in either direction on the bed, there have been provided the stop valves 172 and 173 mounted on the side of the column and having the dog actuable portions 174 and 175 for respective engagement with the adjustable dogs 176 and 177 mounted on the dog rail 178 of the bed. These stop valves are normally held in depressed positions by springs 179. A conduit 180 connects the right hand groove of the reversing valve with the stop valve 172 and a conduit 181 correspondingly connects the left hand groove of the reversing valve with the stop valve 173. As the machine column moves toward the left as viewed in Figure 1, the dog 176 will engage plunger 174 raising the automatic stop valve. This couples conduit 180 with the reservoir conduit system 134, short circuiting the pump 160 to reservoir and discontinuing actuation of motor 14. Similarly, when the reversing valve 166 is in its opposite or right hand position, the pressure conduit 161 from pump 60 will be coupled with the left hand groove of the valve and thus with conduit 181 extending to the stop valve unit 173. This conduit is normally blocked, but when the valve is opened by engagement with dog 177, the pressure fluid from pump 160 will be short circuited to reservoir, discontinuing actuation of the column moving motor 14.

As a safety precaution, there is coupled with the pintle 163 a piston 182 movable in cylinder 183 which is connected to conduit 184 by way of valves 185 and 194 to the reservoir conduit system 170. Clockwise adjustment, of valve 185 by movement of stop lever 186 will couple conduit 184 with pressure conduit 161 so that the pressure will react on the piston 182, moving same to left and cutting down the pump delivery to zero. This operation of the valve also couples the safety system conduit 187 with reservoir conduit 170 while at the same time valve 188 by its clockwise movement couples the pressure conduit system 137 from pump 139 with the auxiliary safety conduit system 189.

The main and the auxiliary safety systems function in a corresponding manner and are particularly related to the tracer mechanisms which are pattern controlled: namely, the unit 86 for determination of the angle and transverse positioning of the tool carrier head, the unit 104 for determination of vertical adjustments and the unit 77 for determination of lateral movements of the main slide on the column, although the mechanism is capable of additional utilization in connection with any of the tracer mechanisms as may be desired. It has been particularly applied, however, to the three above-identified for the reason that all of these tracer mechanisms are under control of patterns or templates carried by the bed so that the tracers are automatically shifted by movement of the column with respect to the bed.

Each of the tracer valves in these units is provided with a groove 190 of sufficient width to remain in communication with the coupled pressure conduit 187 for any potential positioning of each of the valves. Under ordinary circumstances the spool 191 of the valve seals off communication between the pressure conduit 187 and the upper coupling to the valve body of the general reservoir return line 134. However, on excess displacement of any one of the three valves due to excessive movement of its tracer point or finger, the spool 191 will be moved into a position affording communication between 187 and 134 so that the pressure from pump 160 is short circuited to reservoir, stopping operation of motor 14 and thus movement of the column unit.

In either the position shown in Figure 6 or in this displaced valve position, the spool 191 forms a seal preventing coupling through the several valve units of the conduits 134 and 189. When the valve 188 is moved by handle 186 to its stop position the pressure conduit 137C will then be coupled with 189 which will react against the underside of the piston portions 192' of the respective valves, moving the valves into a position of extended retraction to create a backing-off action of these tracer controlled elements. This movement is limited by the adjustable valve stops 192, which prevent coupling of the conduit 189 with the exhaust conduit 134 so that pressure will be maintained in 189 holding the valves in raised position. The effect of this is that the units under control of the valves 77, 86, and 104 will be given a maximum retraction or separation as respects the work. At the same time, the movement of the valve section 185 will couple pressure from 161 through valve 194 and line 184 to react against piston 182. This will move pintle 164 toward neutral, stopping movement of the column 13.

In the event it is desired to reverse the movement of the column with the parts in this retracted position, use may be made of the three-way valve 194 in line or conduit 184. When the valve member 195 is in the position shown in Figure 6, cylinder 183 is directly connected to the valve unit 185. However, when the valve is given a quarter turn counterclockwise, the cylinder 183 will then be connected by conduit 196 with reservoir connection 170, releasing the pressure against piston 182, which is then moved by spring 164 to its pressure producing position. Under these circumstances, movement of valve 166' to the right hand position will reverse the direction of operation of motor 14, moving the sliding column toward the left to its normal starting position.

To facilitate setting up of the machine or initiation of cycles of operation, the templates 79, 93, and 101' are preferably each formed with raised terminal portions 197, particularly illustrated in Figures 8 and 9. These terminal portions project above the contour guiding portion of the patterns or templates. As a result, in initially starting a cutting stroke or for setting up purposes, the machine may be brought to rest with the various tracers engaging the left hand projections 197. The tracer controlled slides will have been moved inwardly near cutting position and the relationship of work and cutter can be checked before starting the actual cutting stroke. Similarly, at the end of the cutting operation, slight continued movement of the column will cause the tracer fingers to ride up on the portions 197 to an extent that the cutter is moved in a position clear of the work before the machine is automatically brought to rest as by the appropriate stop dog or alternatively by the hand actuation of one of the manually controlled valves.

From the foregoing description it will be evident that by the present invention there has been provided an improved automatically controlled machine for the formation of desired contours on airplane spars or other either heavy or relatively light work pieces in which a self-contained driven unit is suitably supported on a bed which may be varied in length according to the maximum length of work to be operated upon, but in which the various functionings of the machine are entirely independent of the bed structure so that the same organized unit may be employed in connection with various capacities of machines. It will be further evident that by construction of the unit that a main transversely adjustable slide to take care of variations in tool path during longitudinal movement with a superimposed tiltable tool carrier that the tool carrier may be readily angled to care for desired variations in the plane of surface to be produced on the work during the traversing operation, while by the interrelationship of the several controls the effective or operative tangent plane to the surface of the tool may be maintained constant for various tilted positionings of the tool for effecting variance of the cutting plane and at the same time any sinuous path over the surface of the work may be followed, depending on the contour of the particular patterns or templates employed.

It will also be appreciated that the present structure is particularly advantageous in that the same templates and control means may be utilized for what is termed either "hand" of cutting on the work, that is, as to whether the desired formation is to be produced on the left or the right side of the work. The structure in question also has the additional advantage that the various movements effected are in direct accordance with and correspondence to the contour of the pattern or template and do not require the utilization of pattern and template contours or the like, differing appreciably from the contour layout of the work itself. Attention is invited to the fact that this is due, among other factors, to the provision of independent controls for the respective movements involved, and the automatic compensation for displacements resulting from tilting of the cutter.

Attention is additionally invited to the improved structural control mechanism by which automatic compensation is effected for both potential lateral and vertical tool surface displacement which has been inherent hitherto in prior art machines utilizing axially tilting cutter constructions.

What is claimed is:

1. A machine of the character described including a work support, a cutter support, a rotatable cutter spindle mounted on the cutter support, means to effect a relative traversing movement of the supports, a pivot mounting one of the supports on the machine to permit angular adjustment of said one of the supports relative to the other, tracer controlled means mounted on the machine and coupled with the angularly adjustable support for controlling said angular adjustment, and additional tracer control means coupled with said pivot for effecting transverse adjustment of the pivot to compensate for offsetting of the cutter spindle resultant from said angular adjustment, said means including an angularly adjustable template, a tracer forming part of said additional tracer control means, said tracer being supported by the machine in position to engage the angularly adjustable template, and drive connections intervening the angularly adjustable support and the angularly adjustable template for effecting simultaneous angular adjustment of said support and template.

2. A machine of the character described including a work support, a cutter support, a rotatable cutter spindle mounted on the cutter support, means to effect a relative traversing movement of the supports, a pivot mounting one of the supports on the machine to permit angular adjustment of said one of the supports relative to the other, tracer controlled means mounted on the machine and coupled with the angularly adjustable support for controlling said angular adjustment, additional tracer control means coupled with said pivot for effecting transverse adjustment of the pivot to compensate for offsetting of the cutter spindle resultant from said angular adjustment, said means including an angularly adjustable template, a tracer forming part of said additional tracer control means, said tracer being supported by the machine in position to engage the angularly adjustable template, drive connections intervening the angularly adjustable support and the angularly adjustable template for effecting simultaneous angular adjustment of said support and template, means mounting the spindle for axial movement relative to its support, and tracer controlled power means coupled with said spindle for effecting axial movement of the spindle with respect to the cutter support.

3. A machine for milling irregular contours comprising a bed, a traversing support mounted on the bed, a cross slide mounted on the support for transverse adjustment with respect thereto, a spindle carrier, a trunnion connecting the carrier and cross slide for relative angular adjustment, a cutter spindle, a support for the spindle, ways mounting the spindle support on the carrier for axial adjustment of the spindle relative to the carrier, a rack on the spindle support, a control slide movable on the carrier, a rack on the control slide disposed in opposed relation to the rack on the spindle support, and an idler intervening and meshing with both of said racks for synchronizing the equal and opposite movements of the spindle support and the control slide.

4. A machine for milling irregular contours comprising a bed, a traversing support mounted on the bed, a cross slide mounted on the support for transverse adjustment with respect thereto, a spindle carrier, a trunnion connecting the carrier and cross slide for relative angular adjustment, a cutter spindle, a support for the spindle, ways mounting the spindle support on the carrier for axial adjustment of the spindle relative to the carrier, a rack on the spindle support, a control slide movable on the carrier, a rack on the control slide disposed in opposed relation to the rack on the spindle support, an idler intervening and meshing with both of said racks for synchronizing the equal and opposite movements of the spindle support and the control slide, power means for effecting movement of the control slide, a control mechanism for said power means including a template and a follower, and means for securing one of said last-named elements to the cross slide and the other to the control slide in opposed cooperating relation, whereby angular adjustment of the carrier will vary the reaction of the template on the follower.

5. A machine for milling irregular contours comprising a bed, a traversing support mounted on the bed, a cross slide mounted on the support for transverse adjustment with respect thereto, a spindle carrier, a trunnion connecting the carrier and cross slide for relative angular adjustment, a cutter spindle, a support for the spindle, ways mounting the spindle support on the carrier for axial adjustment of the spindle relative to the carrier, a rack on the spindle support, a control slide movable on the carrier, a rack on the control slide disposed in opposed relation to the rack on the spindle support, an idler intervening and meshing with both of said racks for synchronizing the equal and opposite movements of the spindle support and the control slide, power means for effecting movement of the control slide, a control mechanism for said power means including a template and a follower, means for securing one of said last-named elements to the cross slide and the other to the control slide in opposed cooperating relation, whereby angular adjustment of the carrier will vary the reaction of the template on the follower, a control valve for the power means coupled with the follower for actuation thereby, and means for urging the follower into engagement with the template.

6. A machine for milling irregular contours including a bed, a support mounted on the bed for translation relative thereto, a traversing slide, ways mounting the traversing slide on the support for transverse movement relative thereto, a hydraulic motor intervening the support and slide for effecting said traversing movement, a hydraulic tracer mechanism coupled with said traversing motor for controlling its operation, said mechanism including a valve and a displaceable tracer finger for operating the valve, an auxiliary slide carried by the support, a template for control of said tracer finger carried by the auxiliary slide, an auxiliary motor coupled with said auxiliary slide for positioning it relative to the support, a template carried by the bed, and means operable by the template for controlling the energization of said auxiliary motor.

7. A machine for milling irregular contours including a bed, a support mounted on the bed for translation relative thereto, a traversing slide, ways mounting the traversing slide on the support for transverse movement relative thereto, a hydraulic motor intervening the support and slide for effecting said traversing movement, a hydraulic tracer mechanism coupled with said traversing motor for controlling its operation, said mechanism including a valve and a displaceable tracer finger for operating the valve, an auxiliary slide carried by the support, a template for control of said tracer finger carried by the auxiliary slide, an auxiliary motor coupled with said auxiliary slide for positioning it relative to the support, a template carried by the bed, means operable by the template for controlling the energization of said auxiliary motor, said latter means including a feed back slide, a tracer unit mounted on the feed back slide, and a tracer finger carried by the unit for engagement with the template on the bed.

8. A machine for milling irregular contours including a bed, a support mounted on the bed for translation relative thereto, a traversing slide, ways mounting the traversing slide on the support for transverse movement relative thereto, a hydraulic motor intervening the support and slide for effecting said traversing movement, a hydraulic tracer mechanism coupled with said traversing motor for controlling its operation, said mechanism including a valve and a displaceable tracer finger for operating the valve, an auxiliary slide carried by the support, a template for control of said tracer finger carried by the auxiliary slide, an auxiliary motor coupled with said auxiliary slide for positioning it relative to the support, a template carried by the bed, means operable by the template for controlling the energization of said auxiliary motor, said latter means including a feed back slide, a tracer unit mounted on the feed back slide, a tracer finger carried by the unit for engagement with the template on the bed, and a reversing gear mechanism intervening the feed-back slide and the auxiliary slide for determining the direction of actuation of the feed back slide for a given deflection of the tracer.

9. A machine for milling irregular contours including a bed, a support mounted on the bed for translation relative thereto, a traversing slide, ways mounting the traversing slide on the support for transverse movement relative thereto, a hydraulic motor intervening the support and slide for effecting said traversing movement, a hydraulic tracer mechanism coupled with said traversing motor for controlling its operation, said mechanism including a valve and a displaceable tracer finger for operating the valve, an auxiliary slide carried by the support, a template for control of said tracer finger carried by the auxiliary slide, an auxiliary motor coupled with said auxiliary slide for positioning it relative to the support, a template carried by the bed, means operable by the template for controlling the energization of said auxiliary motor, said latter means including a feed back slide, a tracer unit mounted on the feed back slide, a tracer finger carried by the unit for engagement with the template on the bed, a reversing gear mechanism intervening the feed-back slide and the auxiliary slide for determining the direction of actuation of the feed back slide for a given deflection of the tracer, a hydraulic operating circuit including conduits coupling the auxiliary slide motor and the tracer unit of the feed back slide, and means for reversing the effective connections of said conduits as respects the tracer unit.

10. A machine for milling irregular contours including a bed, a support mounted on the bed for translation relative thereto, a traversing slide, ways mounting the traversing slide on the support for transverse movement relative thereto, a hydraulic motor intervening the support and slide for effecting said traversing movement, a hydraulic tracer mechanism coupled with said traversing motor for controlling its operation, said mechanism including a valve and a displaceable tracer finger for operating the valve, an auxiliary slide carried by the support, a template for control of said tracer finger carried by the auxiliary slide, an auxiliary motor coupled with said auxiliary slide for positioning it relative to the support, a template carried by the bed, means operable by the template for controlling the energization of said auxiliary motor, said latter means including a feed back slide, a tracer unit mounted on the feed back slide, a tracer finger carried by the unit for engagement with the template on the bed, a reversing gear mechanism intervening the feed-back slide and the auxiliary slide for determining the direction of actuation of the feed back slide for a given deflection of the tracer, a hydraulic operating circuit including conduits coupling the auxiliary slide motor and the tracer unit of the feed-back slide, means for reversing the effective connections of said conduits as respects the tracer unit, a pivot connecting its template to the auxiliary slide, and means for effecting pivotal adjustment of the template to vary its angular position with respect to the slide.

11. A machine for milling irregular contours comprising a bed, a traversing support mounted on the bed, a cross slide mounted on the support for transverse adjustment with respect thereto, a spindle carrier, a trunnion connecting the carrier and cross slide for relative angular adjustment, a cutter spindle, a support for the spindle, ways mounting the spindle support on the carrier for axial adjustment of the spindle relative to the carrier, a rack on the spindle support, a control slide movable on the carrier, a rack on the control slide disposed in opposed relation to the rack on the spindle support, an idler intervening and meshing with both of said racks for synchronizing the equal and opposite movements of the spindle support and the control slide, power means for effecting movement of the control slide, a control mechanism for said power means including a template and a follower, means for securing one of said last-named elements to the cross slide and the other to the control slide in opposed cooperating relation, whereby angular adjustment of the carrier will vary the reaction of the template on the follower, a control valve for the power means coupled with the follower for actuation thereby, means for urging the follower into engagement with the template, power means intervening the support and template for effecting variable positioning of the template with respect to the support, a tracer control mechanism for the power means carried by the support and traversible therewith, said mechanism including a tracer contact, and means on the bed for supporting a template for reaction on the contact variably to control the position of the spindle control template.

12. A contour generating machine comprising a bed, a cutter spindle, a column supporting the spindle on the bed, means intervening the column and the spindle to provide universal adjustment of the spindle with respect to the column including a transversely movable slide, an angularly adjustable carrier mounted on the slide, a cutter spindle slide movable on the carrier, a first tracer control mechanism coupled with the traversing slide to control the movement thereof, a second tracer control mechanism coupled with the carrier for controlling the angular movement thereof, and a third tracer control mechanism coupled with the cutter spindle slide to control the movement of the spindle slide with respect to the carrier, means for effecting translation of the column on the bed, and template means on the bed individual to the said tracer control mechanisms for actuation thereof during translation of the column.

13. A contour generating machine comprising a bed, a cutter spindle, a column supporting the spindle on the bed, means intervening the column and the spindle to provide universal adjustment of the spindle with respect to the column including a transversely movable slide, an angularly adjustable carrier mounted on the slide, a cutter spindle slide movable on the carrier, a first tracer control mechanism coupled with the traversing slide to control the movement thereof, a second tracer control mechanism coupled with the carrier for controlling the angular movement thereof, a third tracer control mechanism coupled with the cutter spindle slide to control the movement of the spindle slide with respect to the carrier a shiftable traverse control slide, a fourth tracer mechanism coupled with said slide for controlling the shifting movement of the traverse control slide, and reversing means intervening the fourth tracer mechanism and the traverse control slide for determining the direction of traverse response for a given reaction of the template as respects said fourth tracer mechanism.

14. In a contouring machine, a structure effective to maintain a constant relationship between a selected portion of the cutter and a workpiece during angular positioning of the cutter, said structure including a supporting column, a cross slide mounted on the column for transverse movement, a spindle carrier pivoted to the slide, a pair of opposed slides mounted on the carrier, gearing interconnecting the slides for effecting opposite movements thereof, a cutter spindle journaled on one of the slides and a contact member mounted on the other slide, an abutment on the traversing slide for controlling engagement with said contact member, a traverse control arm pivotally supported by the column, and connections between the carrier and said arm for determining the angular positioning of the arm in accordance with pivotal movement of the carrier.

15. In a contouring machine, a structure effective to maintain a constant relationship between a selected portion of the cutter and a workpiece during angular positioning of the cutter, said structure including a supporting column, a cross slide mounted on the column for transverse movement, a spindle carrier pivoted to the slide, a pair of opposed slides mounted on the carrier, gearing interconnecting the slides for effecting opposite movements thereof, a cutter spindle journaled on one of the slides and a contact member mounted on the other slide, an abutment on the traversing slide for controlling engagement with said contact member, a traverse control arm pivotally supported by the column, connections between the carrier and said arm for determining the angular positioning of the arm in accordance with pivotal movement of the carrier, means for effecting movement of the abutment in a direction toward and from the carrier and a control contact member for engagement with the traverse control arm carried by and movable with the abutment variably to determine the position of the cross slide.

16. In a contouring machine, a structure effective to maintain a constant relationship between a selected portion of the cutter and a workpiece during angular positioning of the cutter, said structure including a supporting column, a cross slide mounted on the column for transverse movement, a spindle carrier pivoted to the slide, a pair of opposed slides mounted on the carrier, gearing interconnecting the slides for effecting opposite movements thereof, a cutter spindle journaled on one of the slides and a contact member mounted on the other slide, an abutment on the traversing slide for controlling engagement with said contact member, a traverse control arm pivotally supported by the column, connections between the carrier and said arm for determining the angular positioning of the arm in accordance with pivotal movement of the carrier, means for effecting movement of the abutment in a direction toward and from the carrier and a control contact member for engagement with the traverse control arm carried by and movable with the abutment variably to determine the position of the cross slide, and hydraulic power circuits individual to the respective contact members and controlled thereby for determining the positions of their supporting slides.

17. A machine of the character described including a work support, and a cutter supporting column, means for effecting a relative traversing movement of the work support and column, a cutter support, a rotatable cutter spindle mounted on the cutter support, a cross slide carried by the column, a pivot mounting the cutter support on the cross slide for angular movement to effect arcuate adjustment of the cutter spindle, a tracer carried by the column, a control template carried by the machine in position to engage said tracer, control means coupled with the tracer and with said angularly adjustable support for controlling said arcuate adjustment of the spindle, a second tracer carried by the column, a second control template carried by the machine positioned to engage said second tracer, additional control means connecting the second tracer with the cross slide for effecting transverse adjustment of the cross slide and pivot, means mounting the spindle for axial movement relative to the angularly movable cutter support, a third tracer carried by the cutter support, a template supported by the column, and tracer controlled power means coupled with said third tracer and with the spindle for effecting said axial movement of the spindle with respect to the cutter support.

References Cited in the file of this patent

UNITED STATES PATENTS

| Number | Name | Date |
| --- | --- | --- |
| 1,602,860 | Sleeper | Oct. 12, 1926 |
| 1,974,919 | Harris et al. | Sept. 25, 1934 |
| 2,026,042 | Howe | Dec. 31, 1935 |
| 2,081,288 | Armitage | May 25, 1937 |
| 2,324,546 | Taylor | July 20, 1943 |
| 2,424,031 | Heer | July 15, 1947 |
| 2,593,363 | Thalmann | Apr. 15, 1952 |